US005647649A

United States Patent [19]
Kao

[11] Patent Number: 5,647,649
[45] Date of Patent: Jul. 15, 1997

[54] EASILY ASSEMBLED AND ENVIRONMENTALLY PROTECTIVE STORAGE CONTAINER

[76] Inventor: Kuo-Ming Kao, 23F-3, No. 508, Sec. 5, Chung-Hsiao E. Rd., Taipei, Taiwan

[21] Appl. No.: 522,079

[22] Filed: Aug. 31, 1995

[51] Int. Cl.⁶ .............................. A47B 43/02; B65D 5/38
[52] U.S. Cl. .................. 312/261; 312/265.5; 312/9.54; 229/199; 229/198.2; 206/387.12
[58] Field of Search .................. 312/9.54, 9.55, 312/9.47, 9.9, 257.1, 258, 259, 260, 261; 206/387.1, 387.12, 387.15; 229/23 R, 199, 190, 198.2, 913; 40/312

[56] References Cited

U.S. PATENT DOCUMENTS

| 896,600 | 8/1908 | Thornton | 229/198.2 X |
| 3,249,284 | 5/1966 | Wood | 229/198.2 |
| 3,494,685 | 2/1970 | Fiterman et al. | 312/261 X |
| 3,935,990 | 2/1976 | Crane | 229/199 X |
| 4,239,306 | 12/1980 | Klaus | 312/261 X |
| 4,482,074 | 11/1984 | Lalby | 312/265.5 X |
| 4,934,531 | 6/1990 | Chen | 206/387.12 |
| 4,953,779 | 9/1990 | Densen | 40/312 X |
| 5,033,669 | 7/1991 | Federico | 229/119 X |
| 5,472,138 | 12/1995 | Ingram | 229/198.2 |

FOREIGN PATENT DOCUMENTS 444461  3/1936  United Kingdom ............. 312/261

*Primary Examiner*—Peter M. Cuomo
*Assistant Examiner*—James O. Hansen
*Attorney, Agent, or Firm*—Varndell Legal Group

[57] ABSTRACT

A storage container used to store audio tapes, video cassettes, CDs, disks, etc. The container includes a box body made of a paper board which can be recovered for re-use without causing any problem of environmental polution. The paper board can be easily and quickly folded and assembled into the box body without using any tool. The container has light weight and small volume and thus can be transferred and stored at lowered cost. In addition, the container is manufactured at high efficiency with lowered cost. The surface of the paper board can be printed with various colorful stripes, advertising characters or pictures to have versatile appearance.

4 Claims, 10 Drawing Sheets

EASILY ASSEMBLED AND ENVIRONMENTALLY PROTECTIVE STORAGE CONTAINER

BACKGROUND OF THE INVENTION

The present invention relates to a storage container, and more particularly to an easily assembled and environmentally protective storage container used to store audio tapes, video cassettes, CDs, disks, etc.

Nowadays, a variety of boardcasting media such as audio tapes, video cassettes, CDs, disks, etc. are more and more widely used for quickly and conveniently obtaining all kinds of informations. Therefore, many types of storage containers for specifically containing these broadcasting media are developed.

The conventional commercially available storage containers include various kinds of wooden products, plastic products and metal products. However, none of these conventional storage containers can meet the requirements of easy assembly, light weight, small volume, low manufacturing cost, quick production, easy replacement, versatile and colorful appearance and environmental protection. The shortcomings of these conventional products are briefly described as follows:

1. Wooden products: including raw wooden products and plastic plywood products as shown in FIG. 1, wherein:
   A. Raw wooden products: The materials of the raw wooden products are obtained by hacking the trees in the forests. This is extremely unacceptible nowadays in view of environmental protection. Therefore, such raw wooden products are manufactured at very high cost. In addition, such products have less changeability in pattern and are processed at very high expense, so that the raw wooden products are suitable for the public.
   B. Plastic plywood products: The plastic plywood products are made of board materials manufactured from mixed wooden chips and resin by compression. Although such materials can be relatively easily obtained, the materials used in the subsequent processing and the produced wastes are unrecoverable and will cause serious environmental polution. The processing procedure generally includes PVC plastic skin attachment, V-shaped saw bed processing and adhesion or nailing. The wooden chips and wastes produced in the processing procedure or the discarded products are not subject to natural decomposition due to the resin and the PVC plastic skin. In the case of burning down, the toxic and cancerous materials such as dioxine will be produced to contaminate the environment. In addition, the processing procedure is complicated and the manufacturing cost is therefore increased.

2. Plastic products: As shown in FIG. 2, some of the plastic products have assembled pattern. However, due to the limitation of the injection molding, the main body of the product is divided into many very tiny parts so as to meet the requirement of the injection molding and reduce the package volume. Therefore, the manufacturing and processing of such products are more complicated and a large amount of plastic injection steel molds are needed. As a result, the manufacturing and processing cost is increased and the assembling procedure is laborious and time-costing.

3. Metal products: As shown in FIG. 3, the metal products generally have less changeability in pattern, color and stripe and have heavy weight and large volume. Therefore, the manufacturing and transferring cost as well as the recovering cost is relatively high.

SUMMARY OF THE INVENTION

It is therefore a primary object of the present invention to provide a storage container which can be easily quickly processed and assembled and manufactured at low cost. The storage container can be recovered for re-use without causing any problem of environmental polution. In addition, the container has light weight and small volume and thus can be transferred and stored at lowered cost. Moreover, the storage container can be printed with various colorful stripes, advertising characters or pictures as desired to have versatile appearance.

According to the above object, the easily assembled storage container of the present invention includes:

1. a front and a rear rectangular frame bodies made of plastic or metal material and formed with peripheral grooves having several engaging tenons formed therein; several ribs being disposed in the front frame body to reinforce the same and define several drawer holes, several ribs being also disposed in the rear frame body to reinforce the same, several stacking tenons being disposed on the top sections of the front and rear frame bodies and several corresponding locating mortises being disposed on the bottom sections of the front and rear frame bodies, whereby the adjacent containers can be securely and stably stacked with the stacking tenons engaged with the locating mortises;

2. a box body made of a paper bard which is cut with a shape and a size corresponding to those of the peripheral grooves of the front and rear frame bodies and cut with several engaging mortises corresponding to and engaged with the engaging tenons thereof by the blade mold of a high speed processing cutting machine, the lateral edges of the paper board being formed with multiple corresponding projections and recesses which are such shaped as to snugly engage with one another at a bottom of the box body after the paper board is folded to form the box body; and multiple drawers corresponding to and freely drawably passed through the drawer holes of the front frame body into the box body, each of the drawers having a face board at a front end thereof and several internal receptacles for resting audio tapes, video cassettes, CDs, disks, etc. therein.

By means of the above arrangements, the present storage container can be easily and quickly assembled without using any tool or adhesive. The paper board can be easily printed with various colorful stripes, characters, pictures as desired by means of offset printing machine, embossing machine, photogravuring machine and halftone printing machine. Moreover, the box body can be freely replaced to have versatile appearance. Before assembled, the box body is spread as a paper board so that the packing material and transferring cost are reduced and the necessary storage space is minimized. The present storage container can be recovered for re-use without causing environmental pollution.

The present invention can be best understood through the following description and accompanying drawing, wherein:

BRIEF DESCRIPTION OF THE DRAWINGS

FIG. 4A is a cross-sectional view of the front and rear frame bodies of the storage container of the present invention.

DETAILED DESCRIPTION OF THE PREFERRED EMBODIMENT

Figure 1:
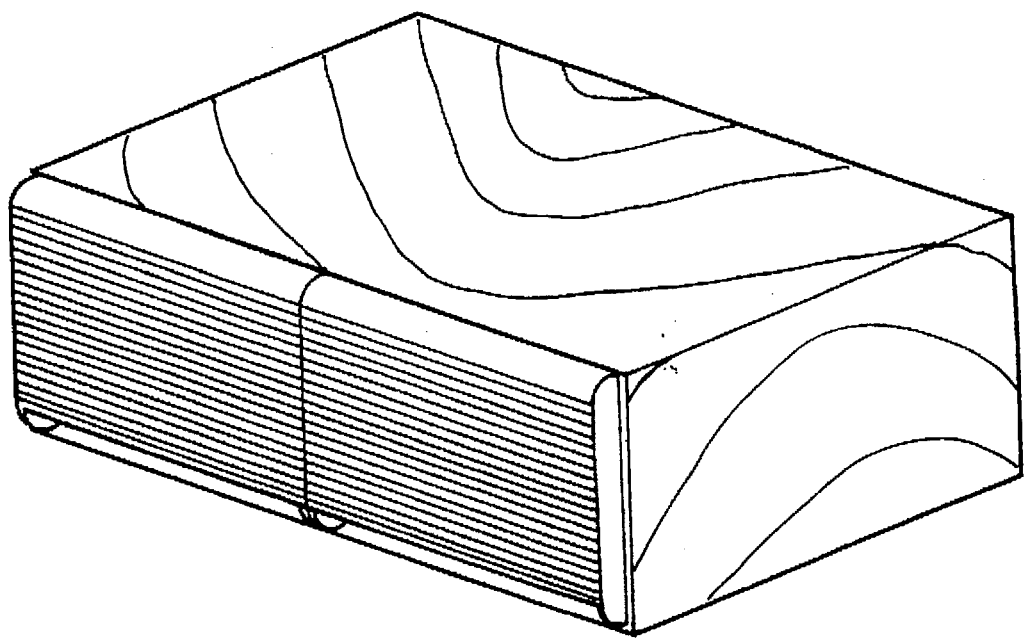
FIG. 1 is a perspective view of a conventional storage container.
Figure 2:
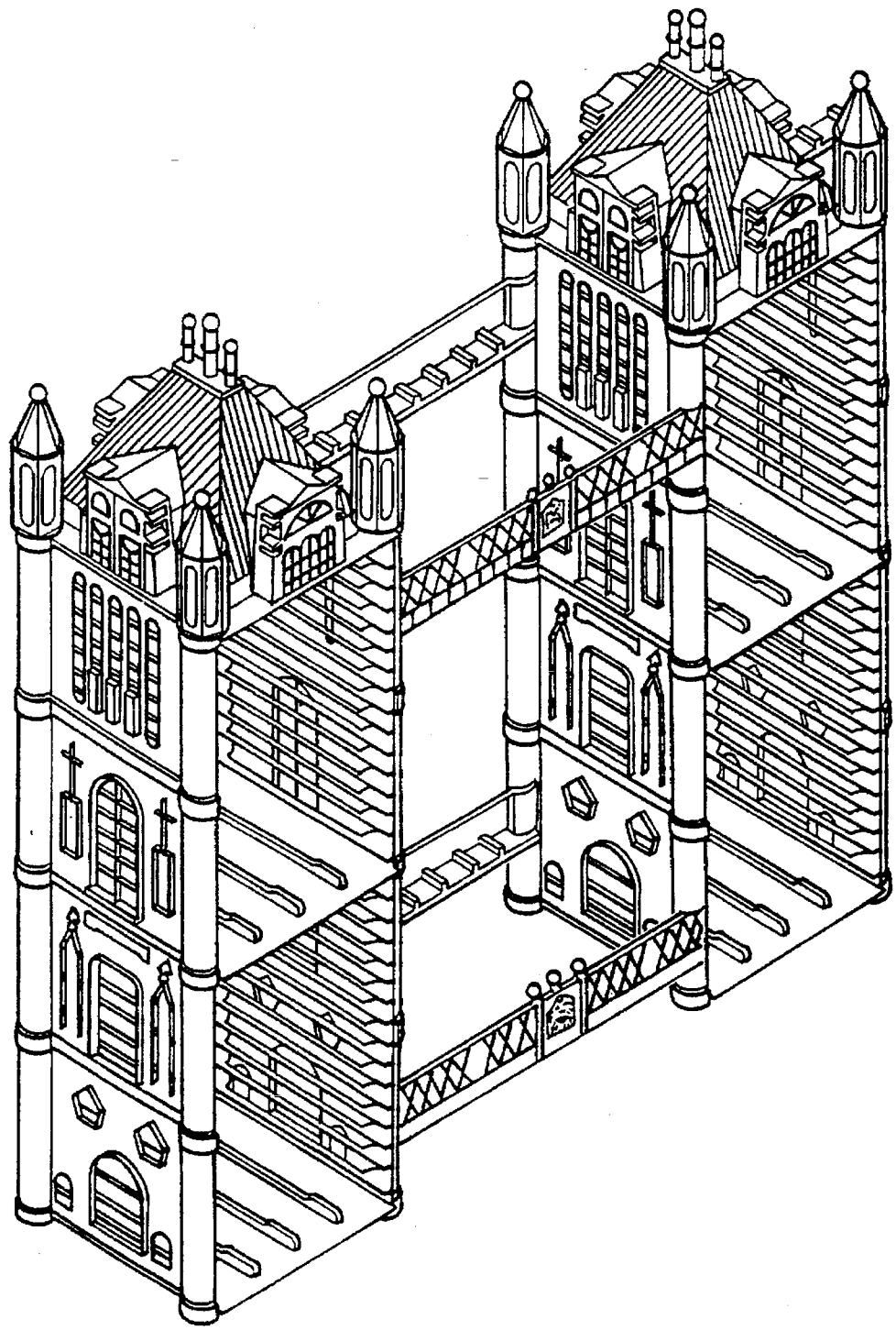
FIG. 2 is a perspective view of another conventional storage container.
Figure 3:
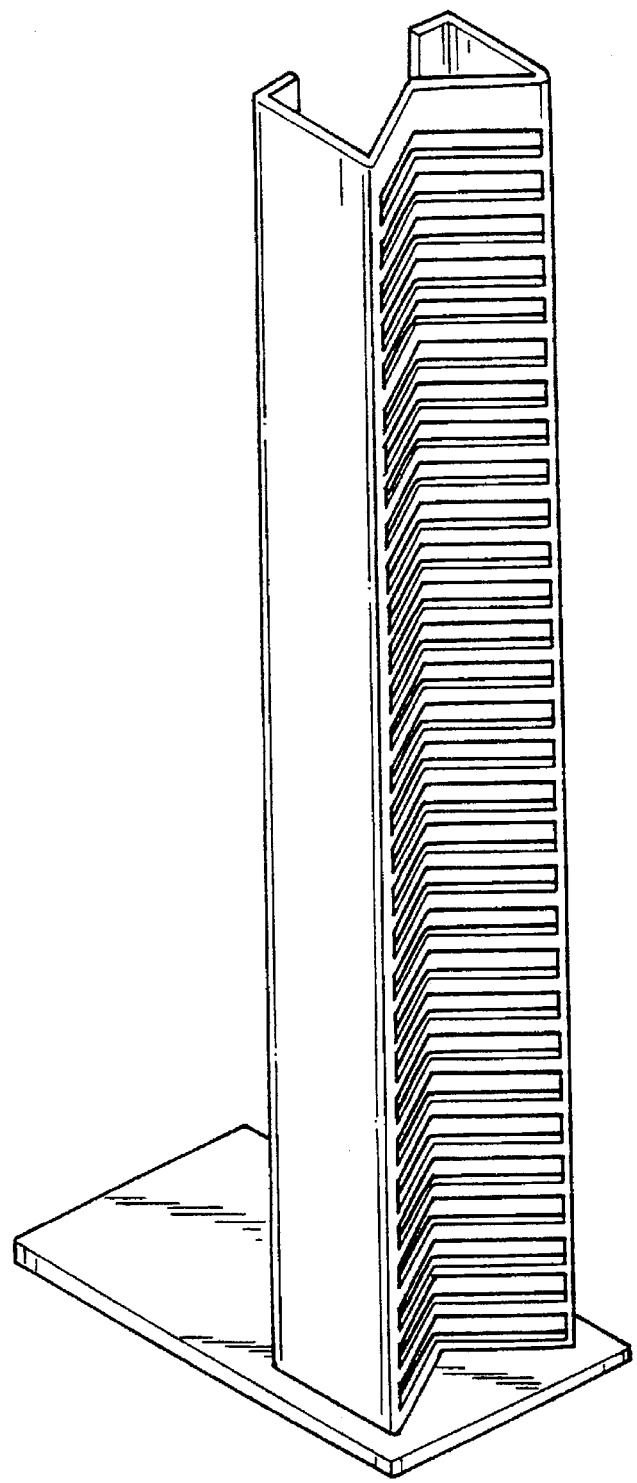
FIG. 3 is a perspective view of still another conventional storage container.
Figure 4:
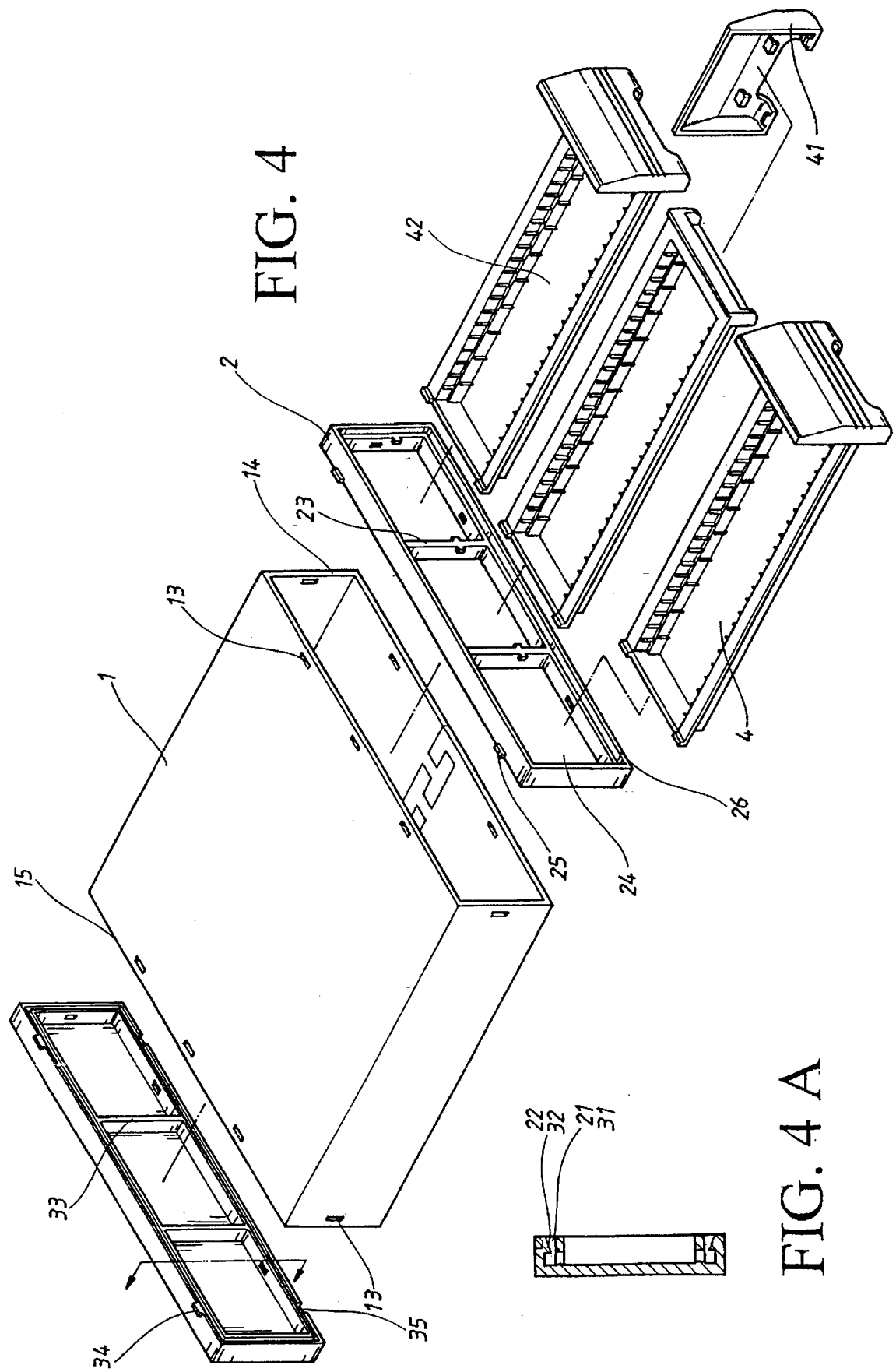
FIG. 4 is a perspective exploded view of a first embodiment of the present invention.
Figure 5:
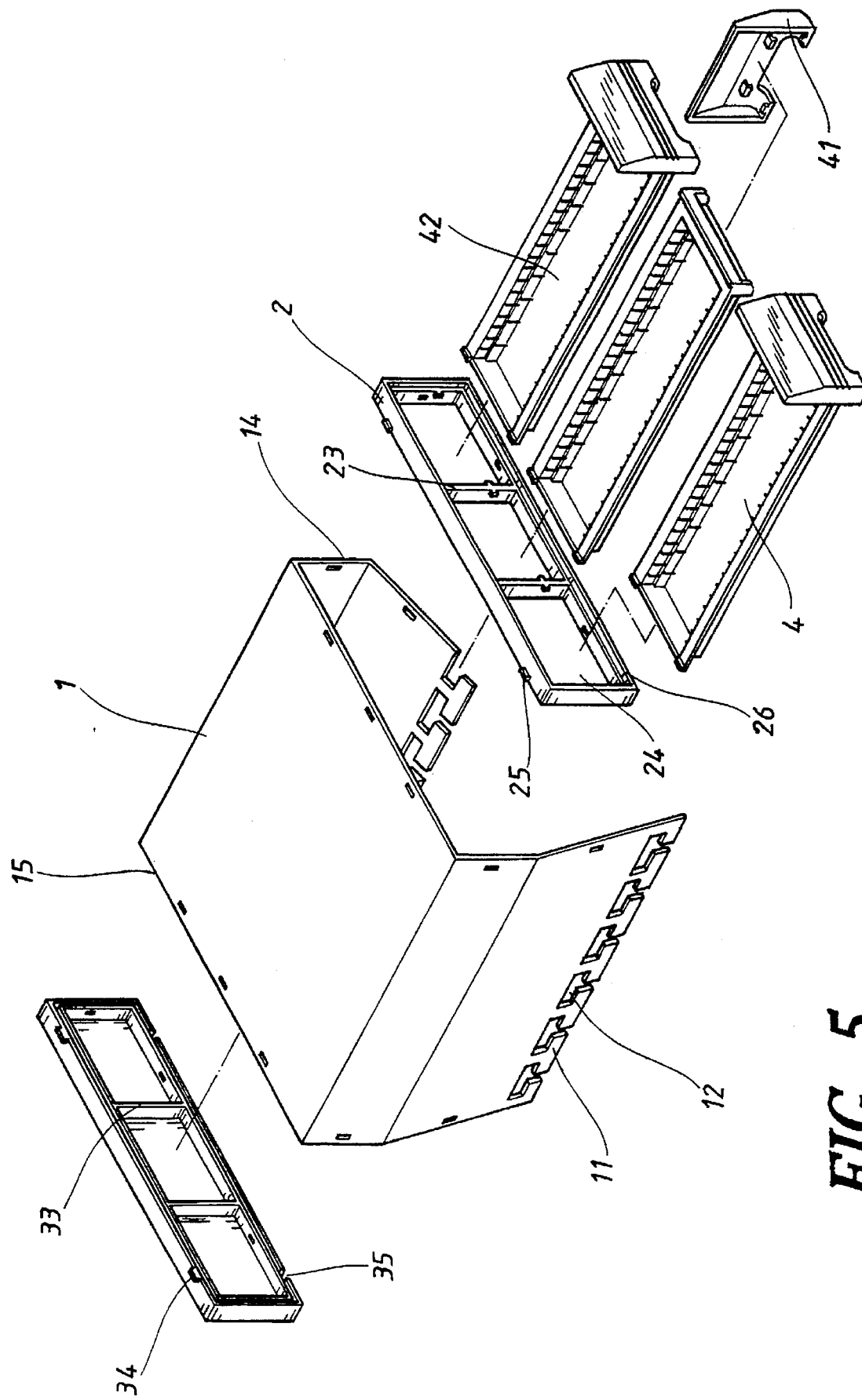
FIG. 5 is a perspective exploded view according to FIG. 4, wherein the box body is half spread.
Figure 6:
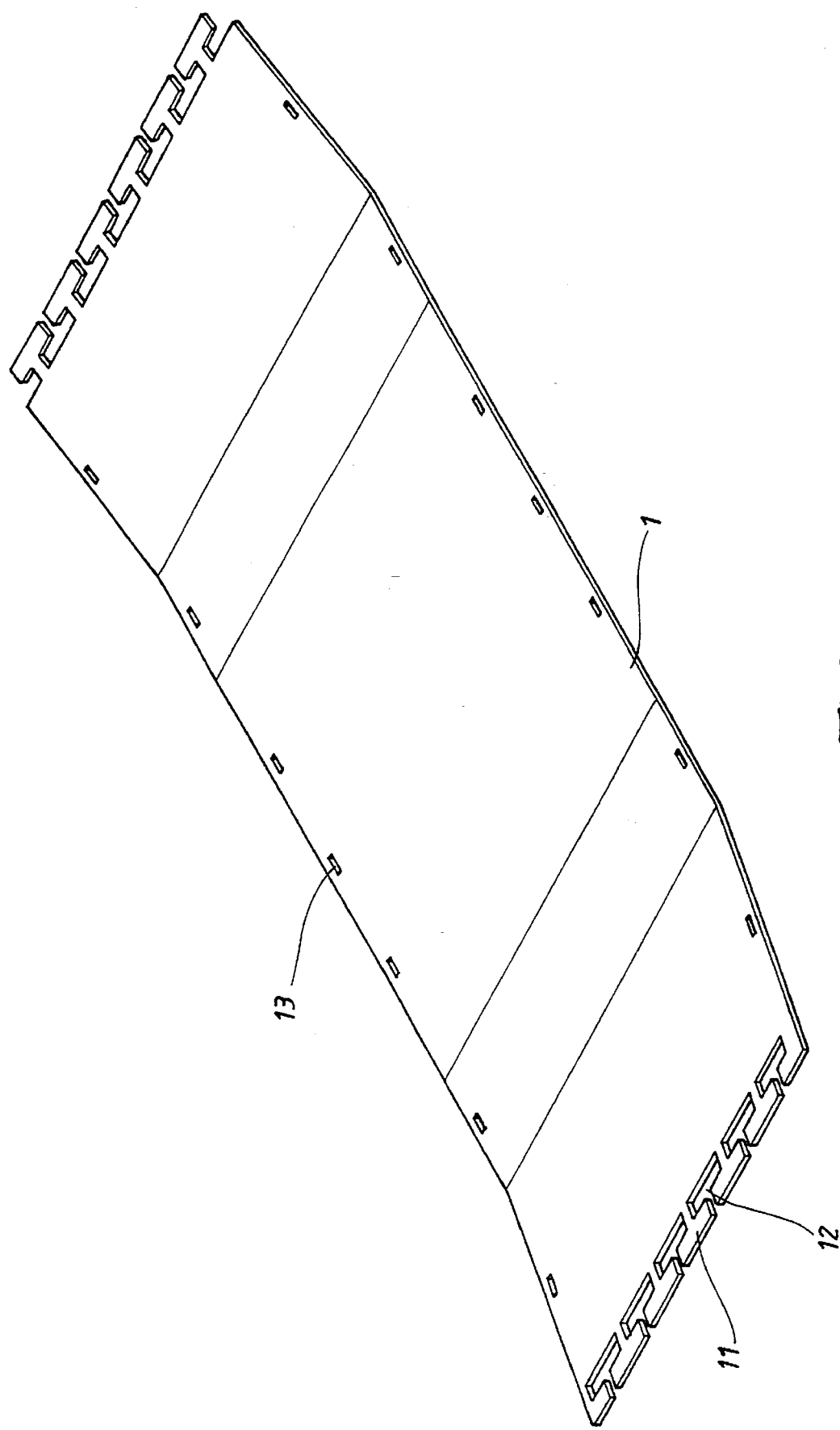
FIG. 6 is a perspective view of the box body in a totally spread state.

Please refer to FIGS. 4, 4A and 5. The container of the present invention mainly includes a paper board-made box body 1, a front frame body 2, a rear frame body 3 and multiple drawers 4. Please refer to FIG. 6 which shows the box body 1 in a spread state, wherein the box body 1 is made of a paper board having two lateral edges formed with multiple corresponding projections 11 and recesses 12. The projections 11 and recesses 12 are such shaped as to snugly engage with one another at a bottom of the box body 1 to form the box body 1. The front frame body 2 is adjoined with a front end 14 of the box body 1 by insertion, having several upright ribs 23 defining several drawer holes 24 for placing the drawers 4 therein. The front frame body 2 is formed with a peripheral groove 21 for the front end 14 of the box body 1 to insert therein. Several engaging tenons 22 are formed in the peripheral groove 21 and several engaging mortises 13 are formed on the front end 14 of the box body 1 corresponding to the tenons 22 for engaging therewith so as to securely connect the front frame body 2 with the front end 14 of the box body 1. In addition, several stacking tenons 25 are disposed on a top section of the front frame body 2 and several corresponding locating mortises 26 are disposed on a bottom section of the front frame body 2, whereby two adjacent box bodies 1 can be fixedly stably stacked with the stacking tenons 25 engaged with the locating mortises 26. The rear frame body 3 is adjoined with a rear end 15 of the box body 1 by insertion. The rear frame body 3 is formed with a peripheral groove 31 for the rear end 15 of the box body 1 to insert therein. Several engaging tenons 32 are disposed in the peripheral groove 31 and several engaging mortises 13 are formed on the rear end 15 of the box body 1 corresponding to the tenons 32 for engaging therewith so as to securely connect the rear frame body 3 with the rear end 15 of the box body 1. The rear frame body 3 also has several upright ribs 33 for reinforcing the the rear frame body 3. In addition, several stacking tenons 34 are disposed on a top section of the rear frame body 3 and several corresponding locating mortises 35 are disposed on a bottom section of the rear frame body 3, whereby two adjacent box bodies 1 can be fixedly stably stacked with the stacking tenons 34 engaged with the locating mortises 35. Each drawer 4 has a face board 41 at a front end thereof and several internal receptacles 42. The drawer 4 is passed through the drawer hole 24 of the front frame body 2 and freely drawably received in the box body 1.

Figure 7:
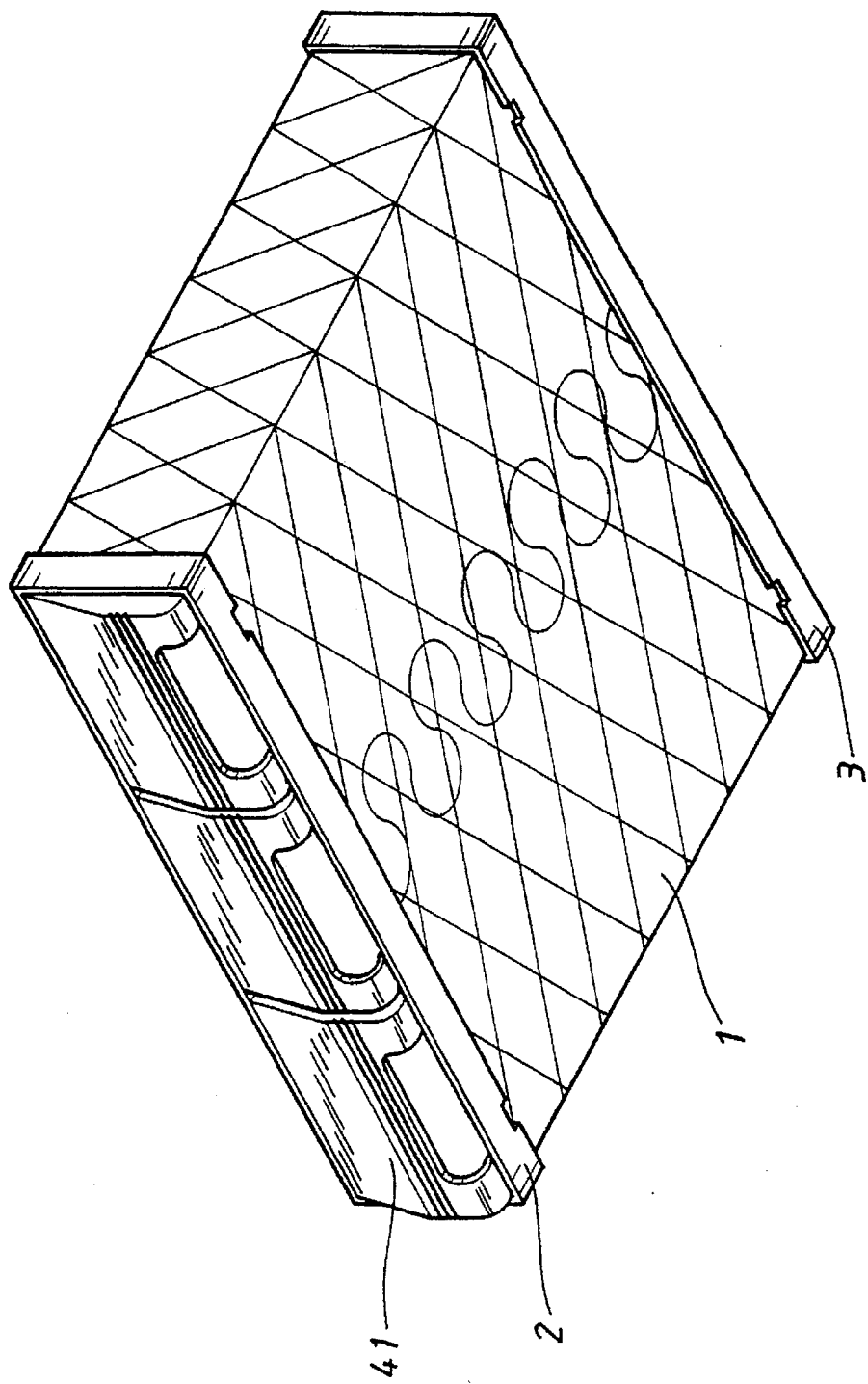
FIG. 7 shows another embodiment of the present invention, wherein the projections and the recesses of the box body are water drop-shaped and snugly engaged with each other and the box body is printed with decorative stripes.

Please refer to FIG. 7 which shows a paper board-made box body 1 printed with various kinds of decorative stripes, characters or pictures.

Figure 8:
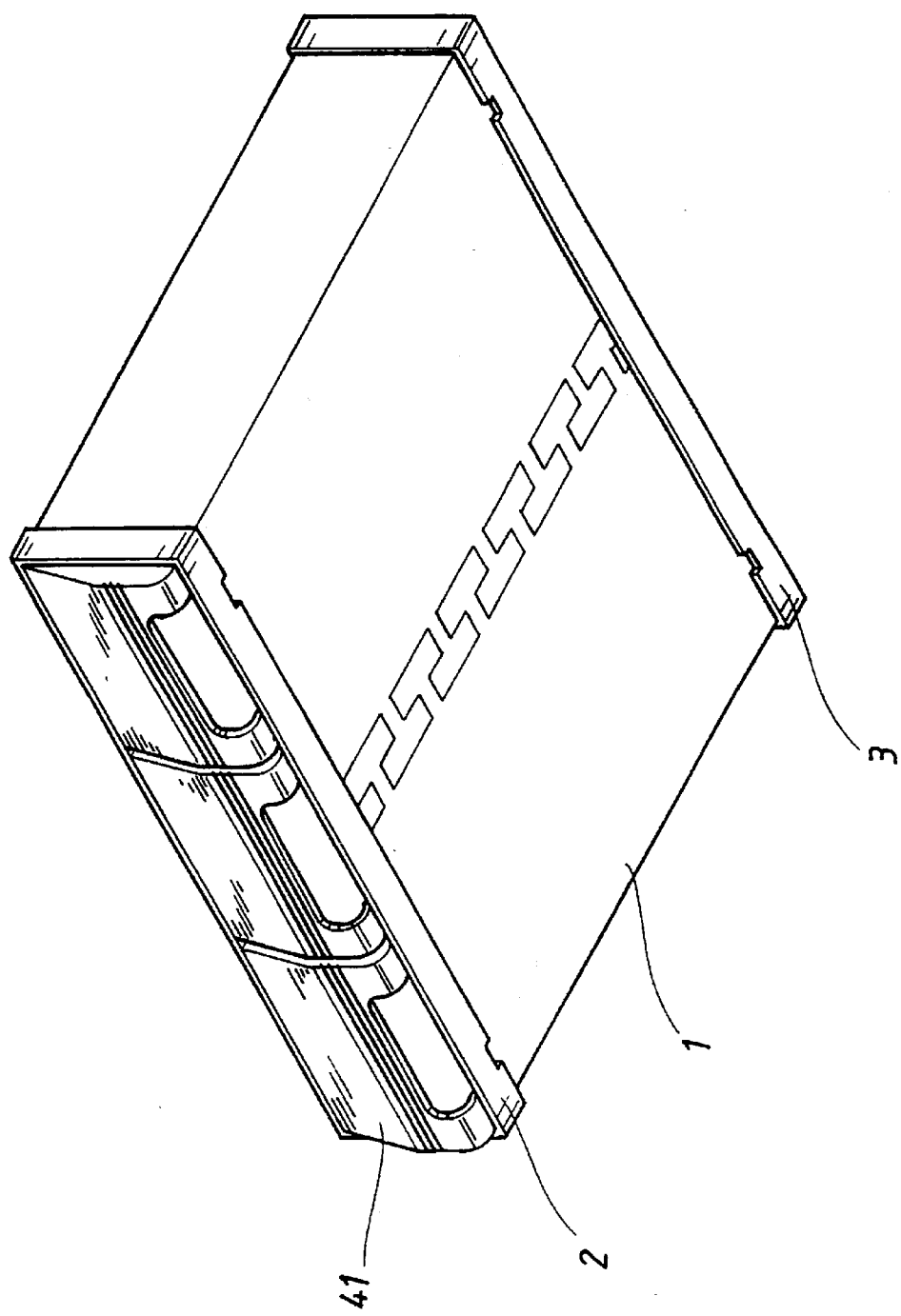
FIG. 8 shows still another embodiment of the present invention, wherein the projections and the recesses of the box body are rectangularly shaped and snugly engaging each other.

FIG. 8 shows a paper board-made box body 1 in which the projections 11 and the recesses 12 are rectangularly shaped.

Figure 9:
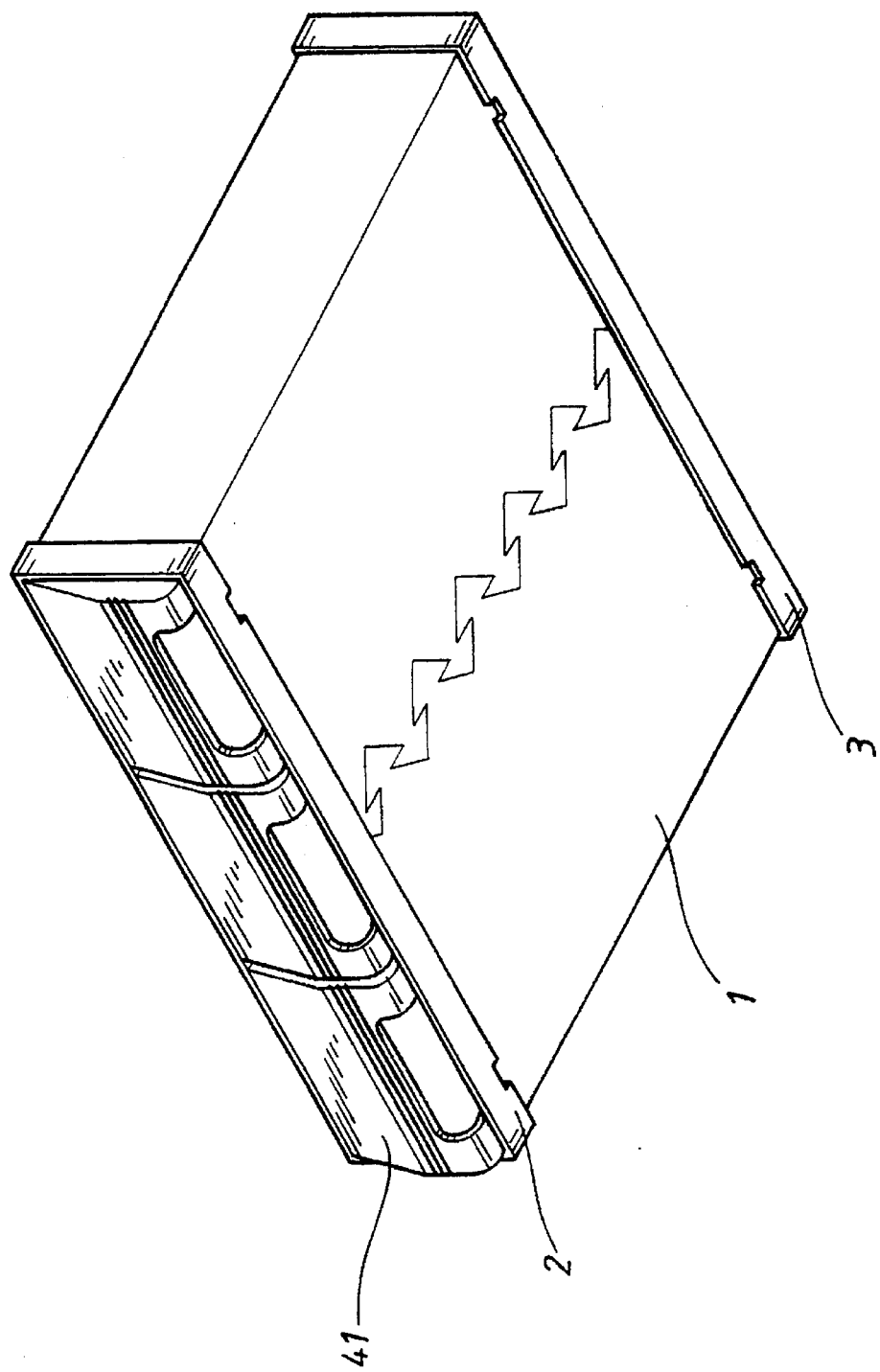
FIG. 9 shows still another embodiment of the present invention, wherein the projections and the recesses of the box body are triangularly shaped and snugly engaged with each other.

FIG. 9 shows a paper board-made box body 1 in which the projections 11 and the recesses 12 are triangularly shaped.

Referring back to FIG. 7, the projections 11 and recesses 12 of the paper board-made box body 1 are water drop-shaped.

Figure 10:
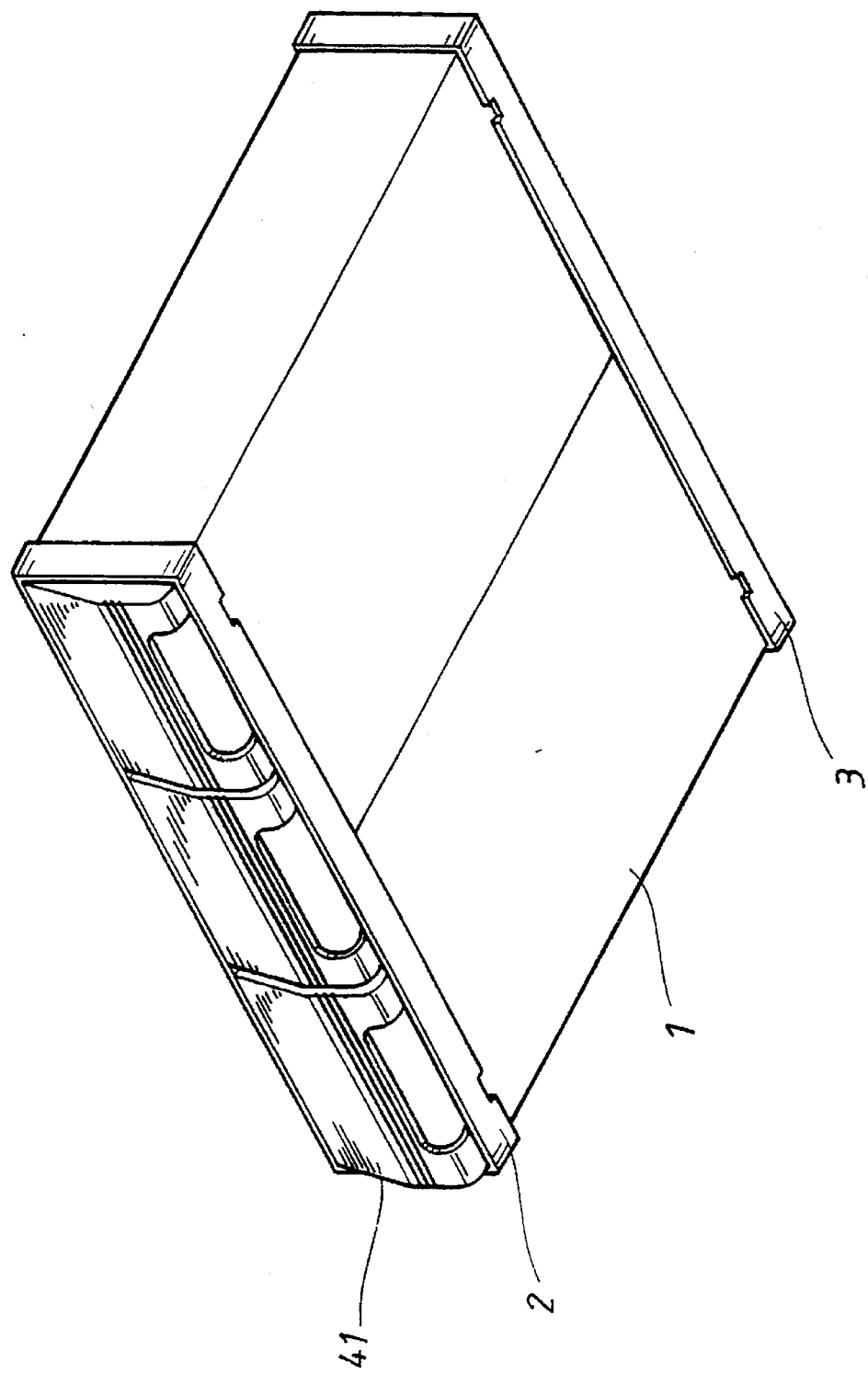
FIG. 10 shows still another embodiment of the present invention, wherein the lateral edges of the paper board are straight and adjoined at the bottom of the box body.

FIG. 10 shows another aspect of the paper board-made box body 1 in which the lateral edges of the paper board are straight and adjoined at the bottom of the box body 1 to form the box body 1.

The above container of the present invention can be widely used to store audio tapes, video cassettes, CDs, disks, etc. The present container is made of a paper board which can be easily replaced and recovered for reuse without causing any problem of environmental polution. The paper bard can be easily and quickly folded to form the box body 1 by means of engaging the projections 11 and recesses 12 without using any tool, screw or adhesive. Moreover, the present container has light weight and small volume and thus can be transferred and stored at lowered cost. Also, the container is manufactured from reduced material at high efficiency with lowered cost. The surface of the paper board can be printed with various colorful stripes, advertising characters or pictures to have versatile appearance.

It is to be understood that the above description and drawings are only used for illustrating some embodiments of the present invention, not intended to limit the scope thereof. Any variation and derivation from the above description and drawings should be included in the scope of the present invention.

What is claimed is:

1. A easily assembled storage container comprising a box body having five closed and unopenable sides and one opened side and a plurality of drawers received in said opened side, said box body made only of three integral parts consisting of a paper board, a front frame body, and a rear frame body; said paper board having a shape of an elongated rectangle with a top edge and a bottom edge, said paper board folded to form box with opposing open front and rear ends by abutting said top and bottom edges, said box defining four of said five closed and unopenable sides of said container, said front and rear ends having a plurality of mortises, said rear frame body received on said rear end and providing one of said five closed and unopenable sides, and said front frame body received on said front end and providing said one opened side, said top edge having a plurality of projections; each said projection having a top portion, a bottom portion, and a central axis extending in a direction parallel to said front and rear ends of said box; said top portion is wider than said bottom portion along said central axis, said projections have a shape symmetrical about said central axis, said bottom edge having a plurality of recesses with a shape exactly matching said shape of said projections so that said projections are tightly received in said recesses without any overlap of said top and bottom edges, said front and rear frame bodies both having a peripheral groove respectively opening in a direction toward said front and rear ends of said box and respectively receiving said front and said rear ends of said box, said peripheral grooves including a plurality of inwardly projecting tenons, said tenons received in said mortises of said front and rear ends of said box for holding said front and rear frame bodies on said front and rear ends of said box, said front frame body including drawer openings, and said plurality of drawers corresponding to said drawer openings, said drawers respectively having a front with a face board and a back with several internal receptacles, said backs of said drawers passing through said drawer openings, and said face boards of said drawers not passing through said drawer openings.

2. The storage container as claimed in claim 1, wherein said top portion of said projections are rectangularly shaped.

3. The storage container as claimed in claim 1, wherein said top portion of said projections are triangularly shaped.

4. The storage container as claimed in claim 1, wherein said top portion of said projections have a water-drop shape.

* * * * *